United States Patent
Malitzki et al.

(10) Patent No.: US 7,159,707 B2
(45) Date of Patent: Jan. 9, 2007

(54) PUSHER FOR SCRAPER CHAIN CONVEYORS, ESPECIALLY FOR UNDERGROUND MINING

(75) Inventors: Hans-Jürgen Malitzki, Castrop-Rauxel (DE); Richard Dobek, Isarlohn (DE)

(73) Assignee: K.B.P. Kettenwerk Becker-Prunte GmbH, Datteln (DE)

( * ) Notice: Subject to any disclaimer, the term of this patent is extended or adjusted under 35 U.S.C. 154(b) by 0 days.

(21) Appl. No.: 10/533,072

(22) PCT Filed: Apr. 23, 2003

(86) PCT No.: PCT/EP03/04218

§ 371 (c)(1),
(2), (4) Date: Apr. 28, 2005

(87) PCT Pub. No.: WO2004/039702

PCT Pub. Date: May 13, 2004

(65) Prior Publication Data

US 2005/0284733 A1 Dec. 29, 2005

(30) Foreign Application Priority Data

Oct. 28, 2002 (DE) ............................. 102 50 161

(51) Int. Cl.
*B65G 19/24* (2006.01)
(52) U.S. Cl. ........................... 198/731; 198/733
(58) Field of Classification Search ............. 198/728, 198/731, 732, 733, 734
See application file for complete search history.

(56) References Cited

U.S. PATENT DOCUMENTS 3,869,039 A * 3/1975 Temme et al. .............. 198/734
6,595,351 B1 * 7/2003 Malitzki ..................... 198/731
2002/0050442 A1 5/2002 Malitzki .................. 198/735.2

FOREIGN PATENT DOCUMENTS

| DE | 3535361 | * | 4/1987 | ............. 198/731 |
| DE | 2970717 U1 | | 4/1997 | |
| EP | 270702 | * | 12/1986 | ............. 198/731 |
| GB | 2188396 | * | 9/1987 | ............. 198/731 |

* cited by examiner

*Primary Examiner*—James R. Bidwell
(74) *Attorney, Agent, or Firm*—Sheridan Ross P.C.

(57) ABSTRACT

A pusher for scraper chain conveyors comprising an upper and lower member, the two members being connectable by bolted connections. Each member of the pusher featuring one part of one or more chain beds through which a flat jointing plane runs, as well as one part of the recesses provided for the bolts of the bolted connections and located to the outside of the chain bed. The upper and lower member embracing each other at least partially, and the upper member being configured as a bow-like bridge element that wraps over both ends of the lower member from above. The two ends of the bridge-like upper member being of cuneiform shape and having upper and lower guide surfaces sloping towards each other in V-formation, and the upper and lower member engaging each other at each end by nose-like centering projections on the upper or lower member, the projections engaging complementary recesses in the contact surfaces of the lower or upper member. Supporting surfaces are provided between the upper and lower member and generate a gap between the upper and lower member.

13 Claims, 16 Drawing Sheets

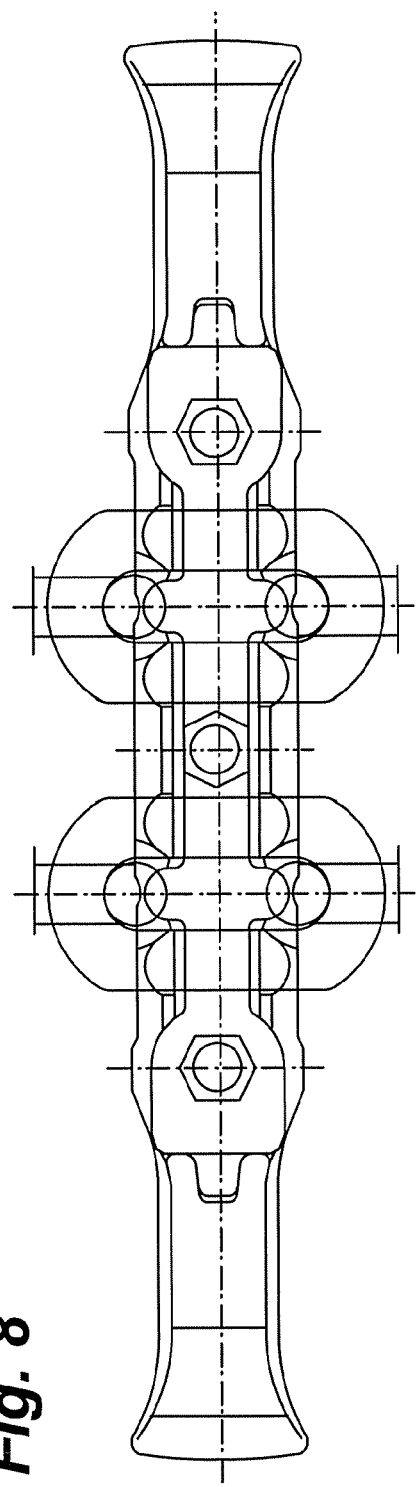
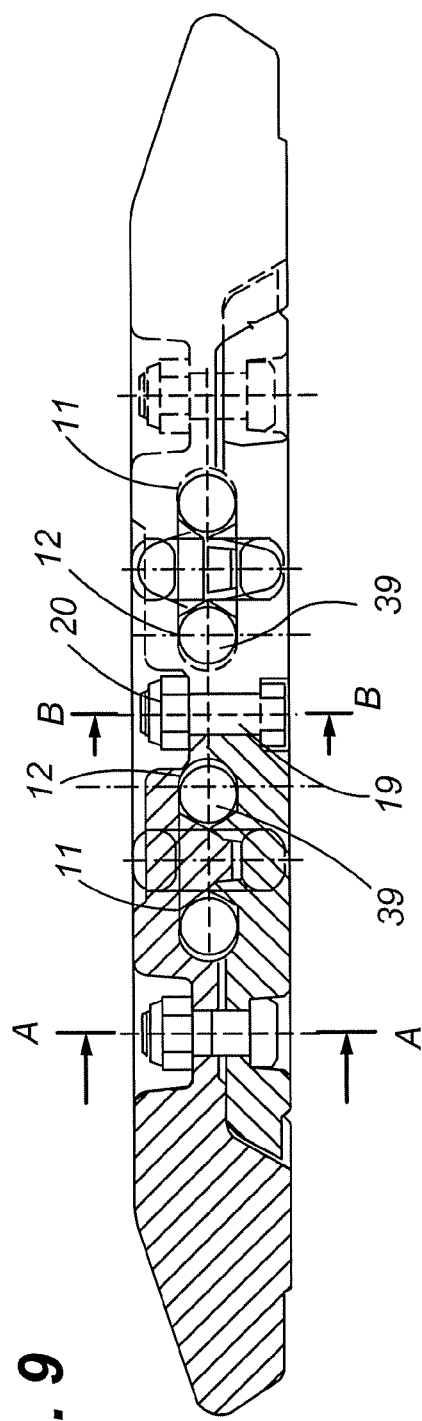
Fig. 8
Fig. 9

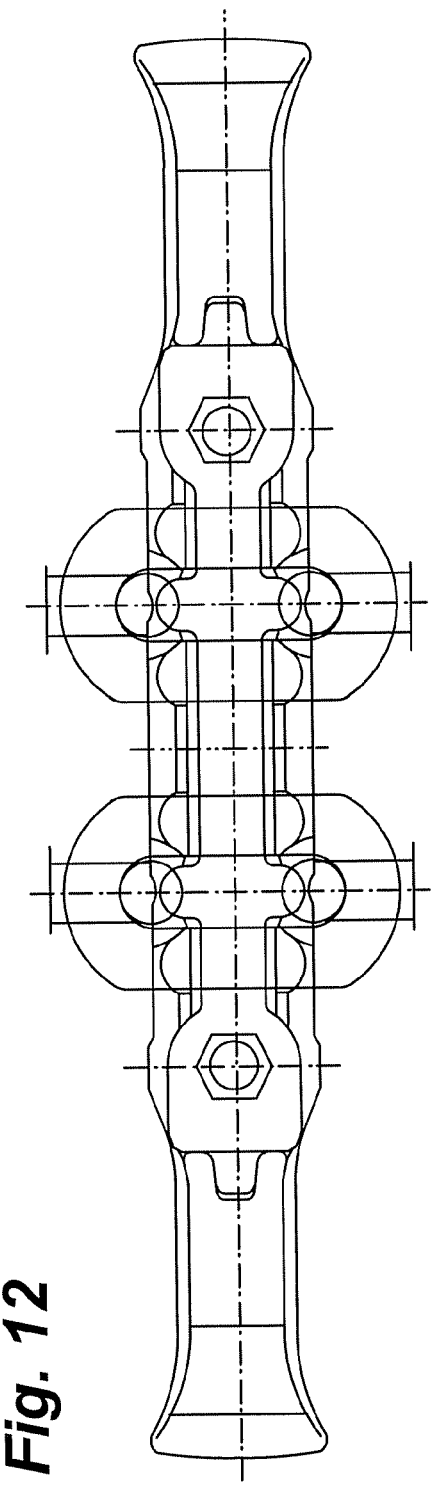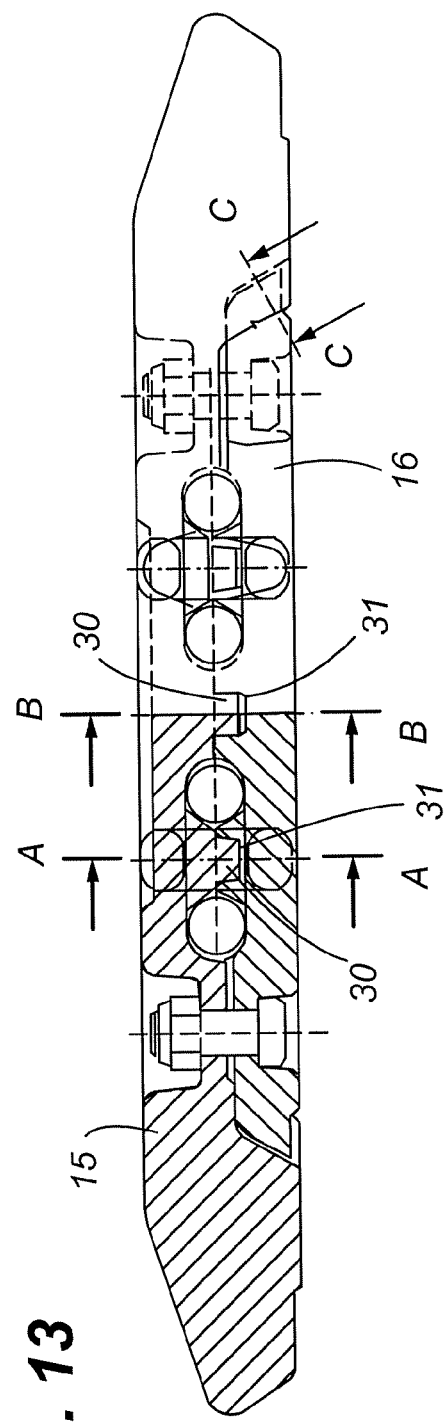
Fig. 12
Fig. 13

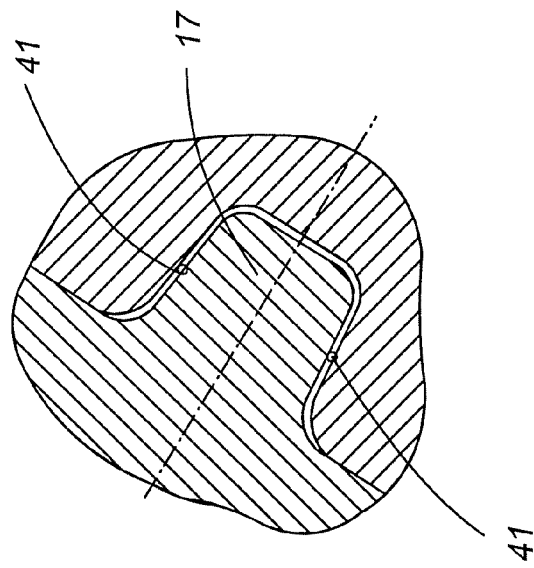
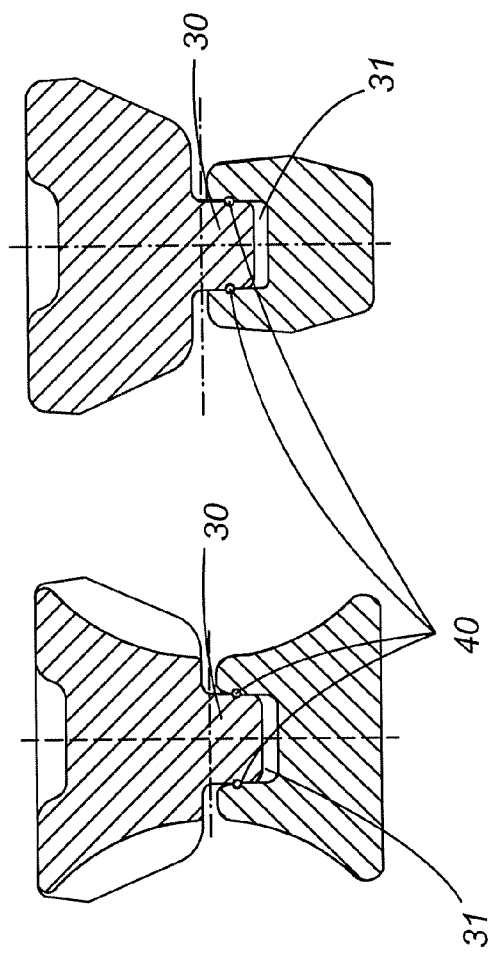

PUSHER FOR SCRAPER CHAIN CONVEYORS, ESPECIALLY FOR UNDERGROUND MINING

The invention relates to a pusher for scraper chain conveyors, especially of the kind used in underground mining, and, in particular, of the kind according to the preamble of claim 1.

Pushers of this type used in underground mining usually comprise two parts, an upper and a lower member which are bolted together, in particular tightly bolted together so as to anchor chain strands located within the jointing plane between the upper and lower members of the pusher. To this end, each pusher is provided with chain beds for the chain links.

Pushers of this kind are known, for example, from the DE-A-27 17 449. The jointing plane between the upper and lower members is configured such that the two ends of the lower member, which, as guide members, engage the lateral guide profiles of the trough conveyor, embrace the upper member. This pusher design has become standard over the course of time because, in offering enhanced wear resistance, it has proved advantageous.

However, the introduction of high forces—for example as a consequence of constraint within the guide profiles—may cause these pushers to bulge and distort, and, in particular, may cause the bolts to shear off and the upper member of the pusher to detach. This problem occurs most frequently after the chain exits large-diameter sprocket wheels of the kind commonly used these days, when, in order to bridge the height difference between the sprocket wheel and the conveyor trough, the chain strands with the scrapers mounted on them are diverted along a curved path by the guide beads arranged in the conveyor frame and are guided downwards under constraint at a steep angle until they slide into the trough profile, the scrapers taking up the necessary pressing force via the end elements.

Lastly, pushers are known (DE 100 40 186 A1) where the upper member is configured in the form of a bridge and wraps over the lower member in clasp-like manner. The ends of the lower member are engineered with centering noses that engage complementary recesses at the ends of the upper member. In the vicinity of the chain bed, centering knuckles are provided that engage complementary recesses in the counterpart. This makes for a very robust assembly and a firm connection between the upper and lower members, these being secured by bolted connections. These bolted connections are provided, in particular, in the two end portions of the upper member and the lower member. Despite the centering engagement mechanism in the end portions of the upper member and the lower member, and the centering engagement mechanism in the vicinity of the chain beds, bending of the pusher under high loads cannot be altogether ruled out. The two end portions of the pusher may bulge as a result, preventing the ends of the pusher from being guided smoothly into the troughs of the guide profiles. In this context, it must be borne in mind that there is little play (about 1 to 3 mm) for the pushers in the lateral troughs of the guide profiles, so that distortion of the pushers during their transport over the round steel chain may lead to constraint within the guide profiles.

The object of the invention is to engineer a pusher which is stable even in cases of constraint and under high loads, and with which deformations and detachment of the upper member from the lower member are prevented. The pusher should nevertheless be easily assembled.

This object is established according to the invention by the features contained in the characterizing part of claim 1, useful developments of the invention being characterized by the features contained in the subclaims.

According to the invention, defined supporting surfaces are provided between the upper member and the lower member, by means of which the upper member and the lower member make contact, and which effect a gap between the upper member and the lower member, at least in the vicinity of the bolted connections. As a result, the bolted connections secure in relation to these surfaces. Even under high loads, this arrangement prevents the lateral ends of the upper member from being pushed upwards in the vicinity of the centering noses when the bolted connection is tightened, thus reliably ruling out any bulging of the pusher. As a result, there is no risk of any constraint within the guide profiles, even under high loads, so that perfectly smooth conveyance is ensured. In this way, the advantage of the clasp-like embracing of the lower member by the upper member, combined with the centering engagement mechanism, is enhanced and any bending upwards or, at the same time, any deformation of the pusher ruled out. The supporting surfaces interact here with the centering engagement mechanisms by way of the centering noses and centering knuckles, and any detachment of pusher members as a result of deformations is prevented. By virtue of the gap, a clean and defined transmission of forces between the upper and lower members via the supporting surfaces is achieved, and a positive force is introduced on tightening of the bolted connections. The space functions here, in particular, as a clamping gap, thus counteracting any bending upwards of the pusher ends.

It is expedient in this context if the supporting surfaces are formed by protuberances on the upper member and/or the lower member, which protuberances generate a slit-like space between the upper member and the lower member, at least in the vicinity of the bolted connections. As an alternative to providing protuberances, the space may also be generated by an appropriate depression in the upper member and/or the lower member. It is expedient to provide the protuberances, which are preferably of a shoulder-like configuration, in the two lateral end portions of the upper member and the lower member.

It is also to advantage that centering knuckles or centering noses that dip into complementary recesses in the counterpart are provided in the vicinity of the chain beds. If the centering noses are made higher, so that they abut on the bottom of the centering recess, a space is formed as a result. This measure may be used, in particular, to ensure that the two chain legs remain free, i.e. are not clamped, when the bolted connections located to the outside of them are tightened. The upper member and the lower member are supported against each other here in the area of the supporting surfaces and at the contact surface formed by the centering nose and the bottom of the complementary centering recess. By way of the shoulder-like protuberances and the centering knuckles provided in the vicinity of the chain beds or between the chain beds, the chain legs may, if desired, be left free, i.e. not clamped; depending on the configuration of the shoulders or centering knuckles, the outer or inner chain leg may be left free, i.e. not clamped between the upper member and lower member. By virtue of the measures according to the invention, the pusher ends are immobilized in all directions and are thus locked in position, making deformations impossible, even under high loads. The lower member, which is embraced in clasp-like manner by the upper member, behaves quasi as a beam that is fixed at both ends.

Embodiments of the invention are described below by reference to the drawings.

FIG. 8 shows a view of a further, alternative embodiment of a pusher, again seen from the underside;

FIG. 9 shows a partly sectional side view of the pusher illustrated in FIG. 8;

FIG. 12 shows a view of a further, alternative embodiment of a pusher, seen from the underside;

FIG. 13 shows a side view, again partly sectional, of the pusher illustrated in FIG. 12;

FIG. 14 shows a sectional view along the line A—A of FIG. 13;

FIG. 15 shows a sectional view along the line B—B of FIG. 13;

FIG. 16 shows a sectional view along the line C—C of FIG. 13;

Figure 23:
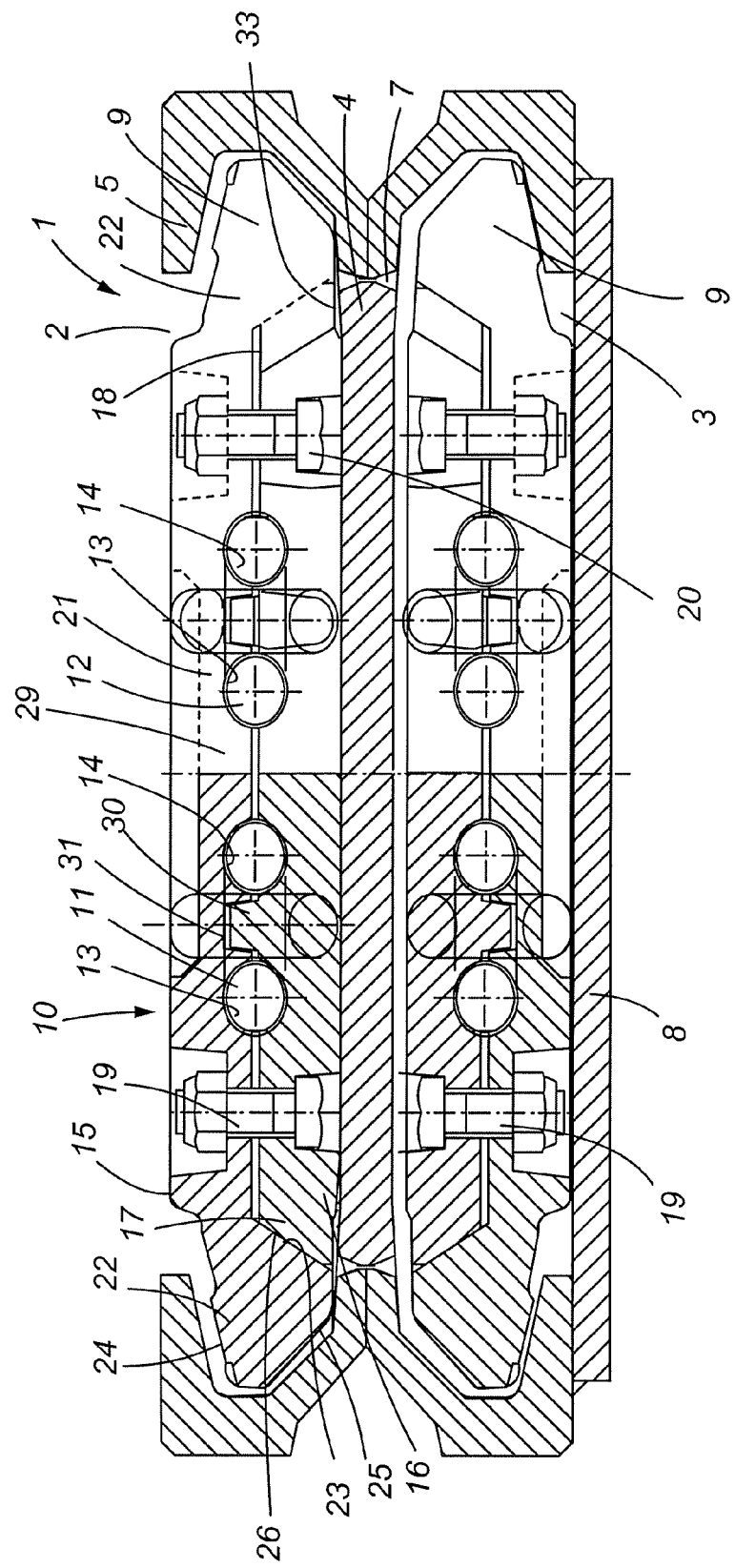
FIG. 23 shows a view of a conventional pusher of a scraper chain conveyor, having upper and lower lateral guide profiles.

FIG. 23 shows a partially sectional view of a scraper chain conveyor of the kind used especially in underground mining to transport lumpy objects and the like. A scraper chain conveyor of this kind, denoted generally by 1, has an upper run 2 and lower run 3. The two runs are separated by a base plate 4 that is welded at each end to the upper and lower lateral guide profiles 5 and 6 of the trough conveyor to form the welds indicated by 7. The guide profiles 5 and 6 are engineered here as trough profiles. The lower run 3 is closed off with a covering plate 8, which, as again shown in the Figure, is welded to the two lateral guide profiles 5, 6 of the trough conveyor.

It can be seen that on the inside, the guide profiles 5 and 6 form a trough profile which encloses the ends, generally denoted by 9, of the pushers 10, all of which are identical, of the scraper chain conveyor.

To secure them in place, the pushers 10 are provided with two centrally located chains, along which the pushers 10 are mounted at equal distances from each other. Accordingly, each pusher has two chain beds 11, 12 to accommodate the two parallel chains. The chain beds, each of which serves to secure one horizontal chain link of a round link chain in position, are identical to each other. For this purpose, parallel chain conduits 13 and 14 are provided for each chain bed 11, 12. The rounded inner surfaces of the chain conduits have a slightly larger radius than do the rounded surfaces of the horizontal steel chain links.

Each of the pushers, denoted generally by 10, is made up of an upper member 15 and a lower member 16. To this end, each pusher is divided along a horizontal plane, the ends of which, however, are angled downwards and outwards due to the special design of the upper member. At the joint surfaces, nose-like projections 17, 18 at the ends of the lower member positively engage complementary recesses 26 in the opposing surface of the upper member, thus centering the upper and lower members. It is of no relevance here whether the noses are engineered on the upper member and the complementary recesses 26 engaging therewith on the lower member, or the other way round. The engagement of the nose-like projections with the complementary recesses 26 makes for good transmission of forces, while the larger contact surface area reduces wear. An added advantage is that any displacement of the upper and lower members of the pusher under the influence of forces acting in the direction of transport is prevented.

To secure the horizontal chain links in the chain beds 11 and 12 in position, and also the upper and lower members 15 and 16, bolts 19, 20 are provided, each of which is located to the outside of the chain bed; in the embodiment shown, they are located, in particular, between the chain bed and the corresponding end of the pusher. The bolts, which engage corresponding nuts and constitute the bolted connections for the upper and the lower members, are preferably configured identically in all the pushers 10.

The upper member 15 of each pusher 10 is engineered as a bow-like bridge element and has an essentially planar, bar-like central part 21 extending transversely to the direction of transport. The extremities of the central part 21 adjoin downwardly projecting, cuneiform ends 22, which wrap over the lower member 16—which is likewise designed as an essentially planar, bar-like part—from above and confine it between them in a clasp-like manner. Contact between the upper and lower members is effected along an oblique surface 23 extending outwardly from top to bottom. The surfaces 23 are configured on the nose-like projections. Corresponding oblique surfaces are naturally provided on the complementary recesses 26, too.

The two ends 22 of the bridge-like upper member 15 are designed as pusher guide members. In consequence of their cuneiform shape, they have an upper guide surface 24 and a lower guide surface 25, which approach each other obliquely.

In the embodiment according to FIG. 23, nose- or knuckle-like protuberances 30 are provided between the chain beds 11 and 12 of the lower member. Each of these projections engages a complementary recess 32 in the central land 29 of the upper member, and serves as a centering protuberance. This arrangement, together with the nose-like engagement mechanism at the ends of the upper and lower members, increases the stability with which the upper and lower members are held together.

At both ends of the lower member 16 a recess 33 may be provided, creating a space between each end of the lower member 16 and the base plate 4 shown in FIG. 23. This means that the weld at 7 connecting the base plate 4 and the trough conveyor's lateral guide profiles 5, 6 is effectively bridged.

Figure 1:
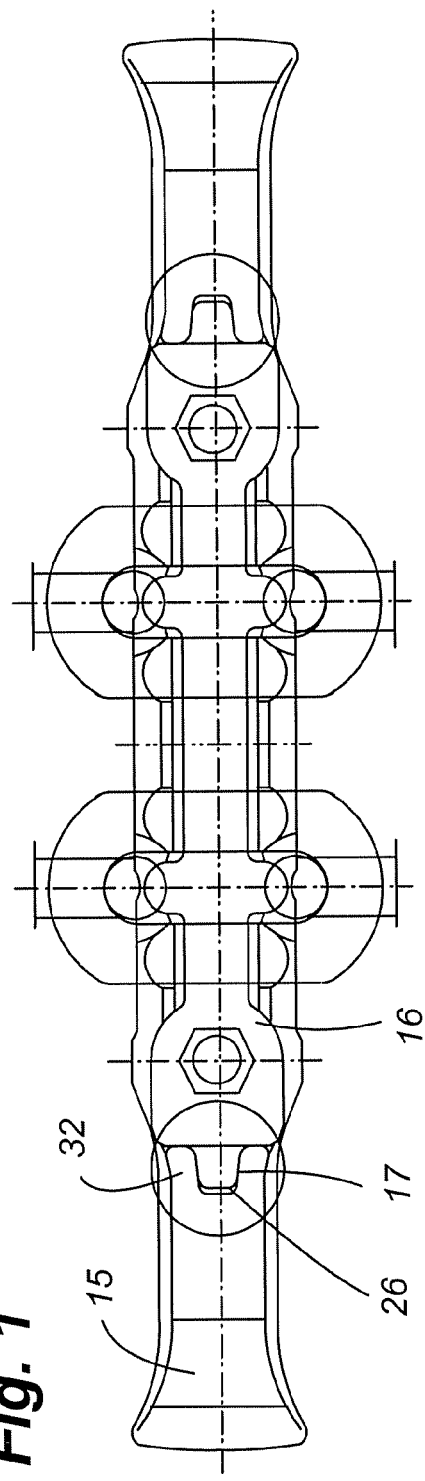
FIG. 1 shows a view of a pusher comprising an upper and a lower member, seen from below.

In the embodiment according to FIG. 1, the nose-like centering projections 17 are located at both ends of the lower member 16 and engage complementary recesses 26 of a fork-like internal section 32 of the lower member 16. There is thus an appropriate centering engagement mechanism provided between the upper and the lower members at both ends of the pusher.

An additional centering engagement mechanism is formed by the interaction or engagement of the knuckle-like protuberance 30 and the recess 31, which are provided between the chain beds 11 and 12. In the embodiment shown in FIGS. 1 and 2, the centering knuckles 30 are located on the upper member while the recesses 31 are located on the lower member. In addition, between the two centering knuckles 30 located between the chain beds 11 and 12, a further, centrally located centering knuckle 30 is provided, which is again engineered on the upper member and engages a complementary recess in the lower member. The combination of these centering engagement mechanisms ensures that the pusher is firmly held together, the joint being secured by the bolted connections 19, 20.

In addition, between the upper member and the lower member, a space 32 is provided, here slit-like, which, in the embodiment illustrated, extends to the other end, that is, to the other bolted connection 19, 20, and which is documented in the drawing, too, in the vicinity of the centering knuckle. In the embodiment according to FIGS. 1 and 2, this space is formed by a protruding shoulder 34 generated by a depression in the upper member. These shoulders 34 are provided at both ends of the pusher; in the embodiment illustrated, they are located to the outside of the bolted connections 19, 20. As a result, the opposing surfaces of the upper and lower members, particularly in the vicinity of the bolted connections provided at both ends, do not make direct contact, i.e. there is a gap between them. The support shoulders 34 are engineered, in particular, on the upper member in the vicinity of the nose-like engagement mechanism comprising the centering noses 17 and the recess 23. A defined space 33 is thus created, particularly in the vicinity of the bolted connections 19, 20. Consequently, when the bolted connections are tightened, a positive force is generated and the upper and lower members are clamped together, thus permitting perfect transmission of forces between the upper and lower members and preventing deformation of the pusher even under high loads; particularly in combination with the centering engagement mechanism, this arrangement prevents distortion of the upper member and the lower member under conditions of severe constraint and the forces associated therewith. Forces of this kind are generated especially when the chain conveyor is passed over a large-diameter sprocket wheel and the chain is then guided steeply downwards before it enters into the guide profile of the trough conveyor; with conventional pushers, this may result in arcuate bulging of the pusher. As a consequence, the bolted connections may shear off, causing the upper member to detach; another possible consequence is constraint within the lateral guide profiles. This gap, particularly in the vicinity of the bolted connections, which is formed by the shoulders 34 engineered on the upper member and which prevents arcuate deformation of the lower member with resultant detachment of the upper member, is thus essential to the stable configuration of a pusher.

Figure 3:
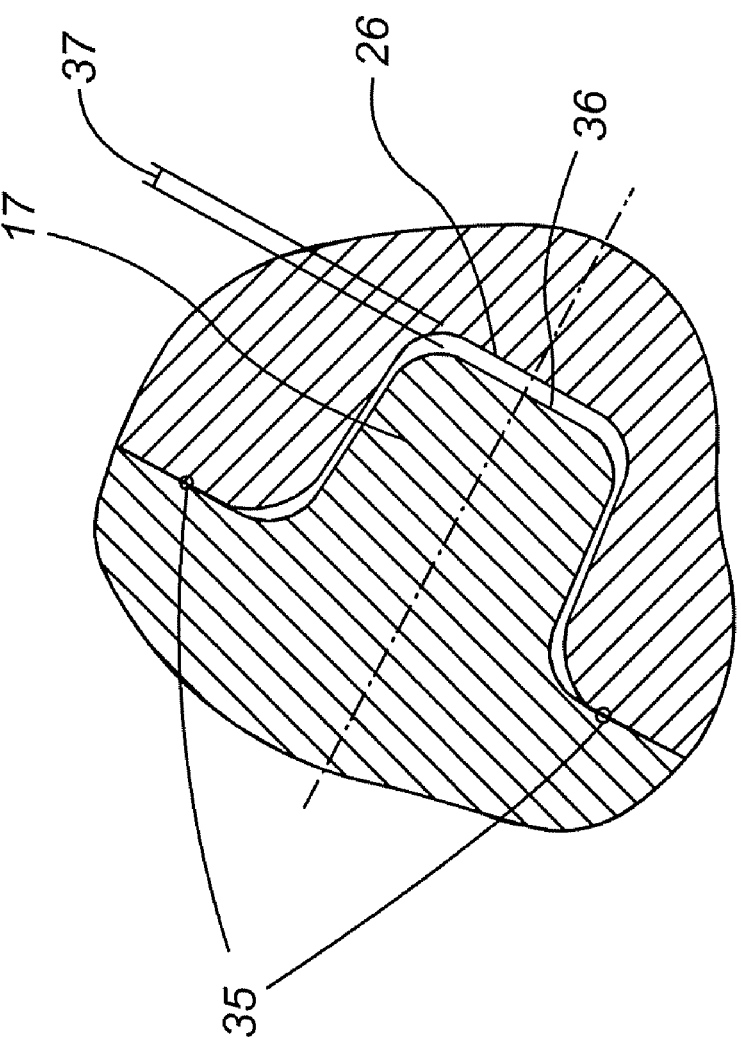
FIG. 3 shows a sectional view of the pusher along the line A—A of FIG. 2.

As shown clearly in FIG. 3, the contact surfaces for the centering engagement mechanism comprising the nose 17 and the recess 26 are formed on the lateral bearing surfaces to either side of the centrally located centering nose 17. These contact surfaces are denoted by the reference numeral 35. It is expedient that these contact surfaces 35 are engineered to run obliquely from top to bottom, corresponding to the taper of the frontal surface of the centering nose 17. Between the frontal surface 36 of the centering nose 17 and the recess 26, there is a gap 37.

Figure 4:
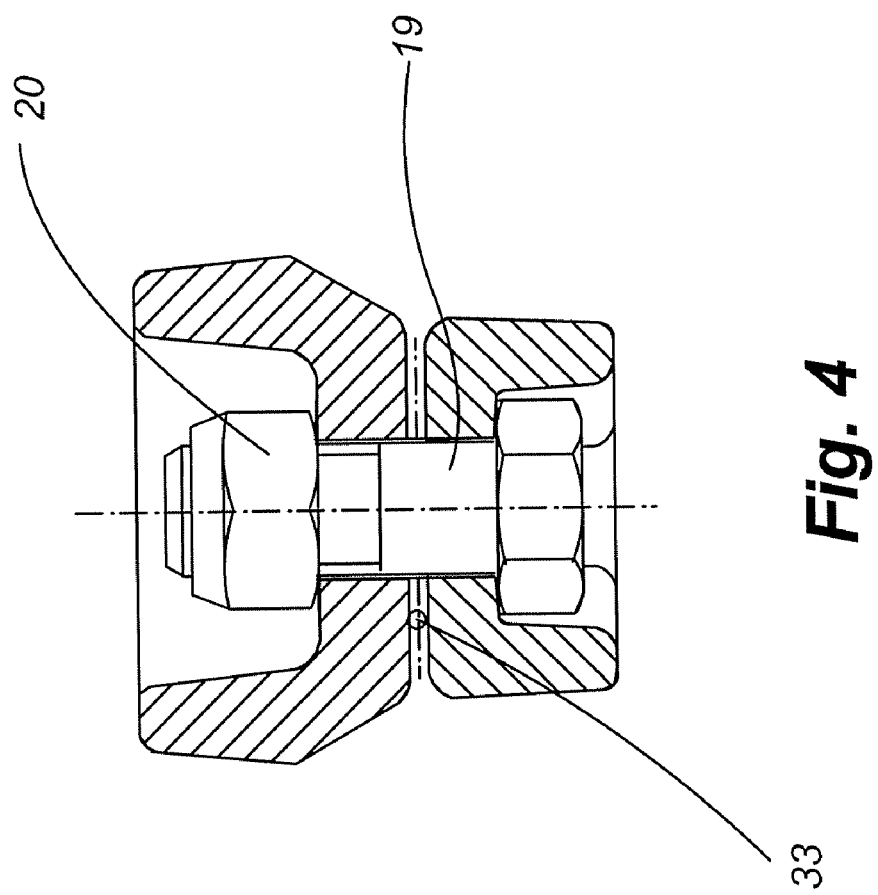
FIG. 4 shows a sectional view along the line A'—A' of FIG. 2.

As already explained, the opposite arrangement is also possible, i.e. with the centering nose provided on the upper member and the fork-like section constituting the recess on the lower member. FIG. 4 shows the clamping gap 35 generated by the supporting shoulders 34, which is configured particularly in the vicinity of the bolted connection 19, 20.

Figure 5:
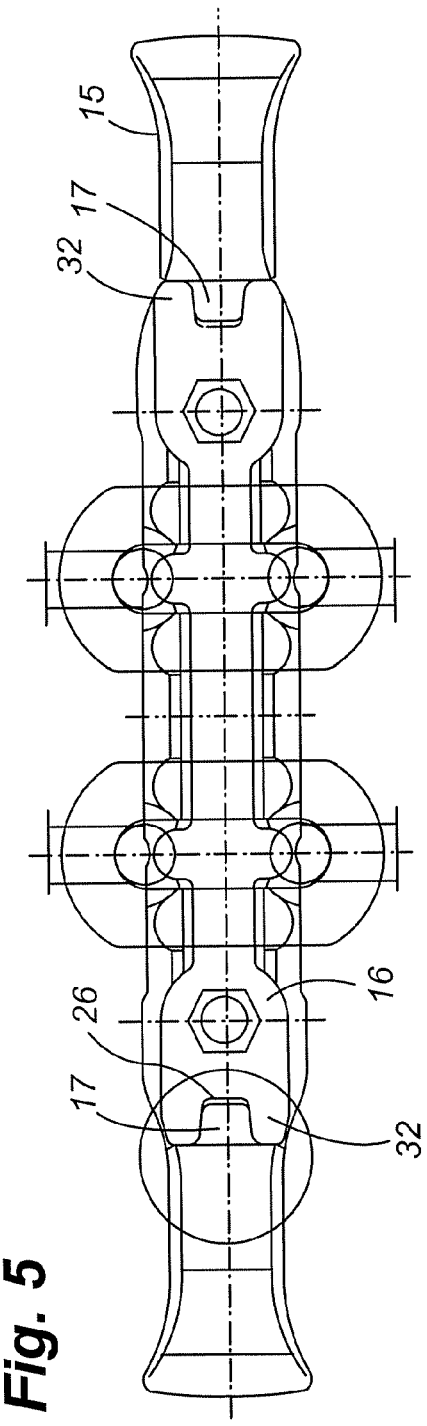
FIG. 5 shows a further, alternative embodiment of a pusher, again seen from the underside.
Figure 6:
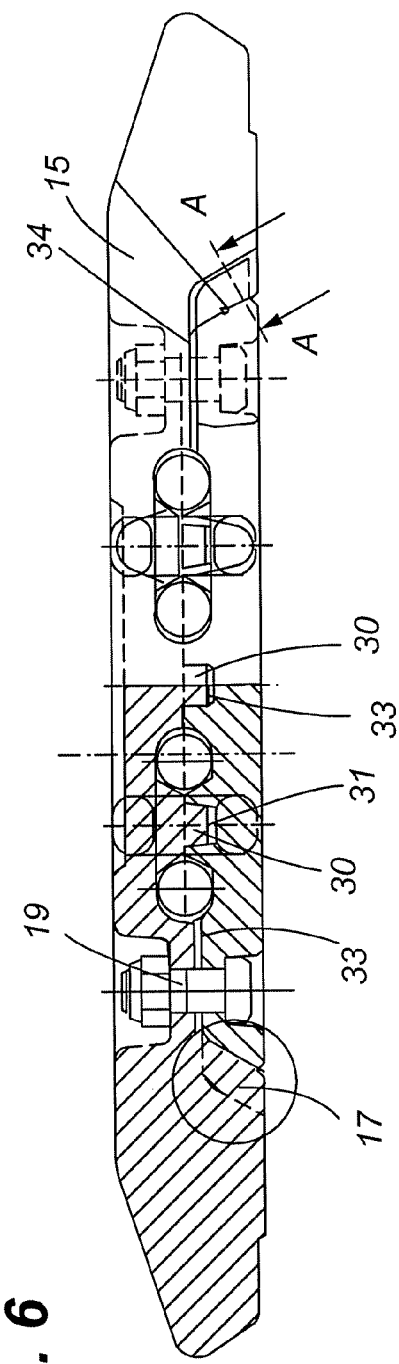
FIG. 6 shows a partly sectional side view of the pusher illustrated in FIG. 5.
Figure 7:
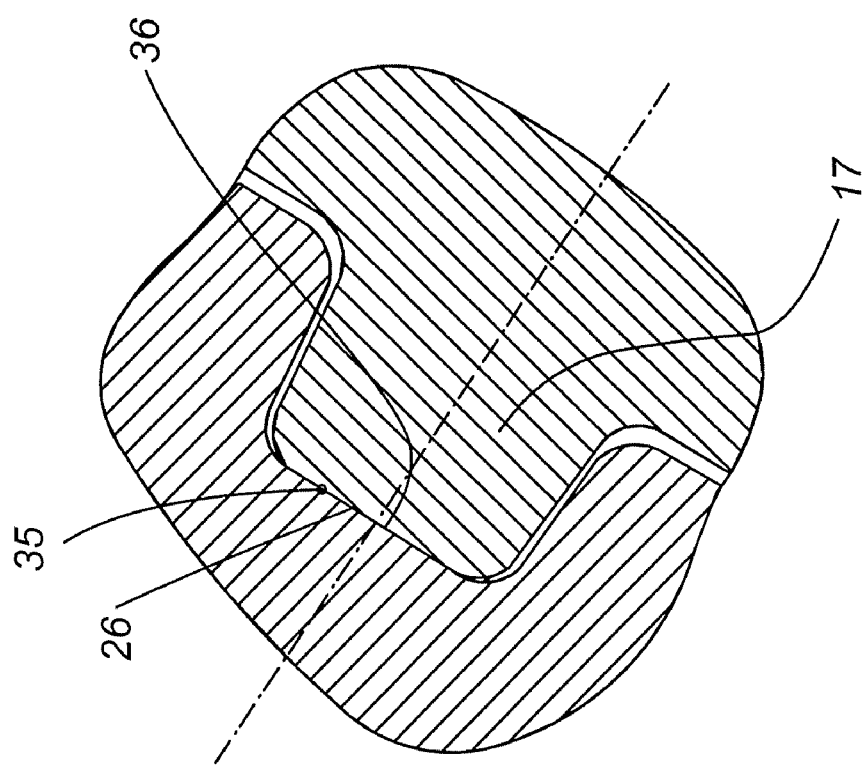
FIG. 7 shows a sectional view along the line A—A of FIG. 6.

The embodiment according to FIGS. 5 and 6 resembles the previously described embodiment but differs in that the centering noses 17 are engineered on the upper member 15 while the complementary recesses 26, limited by the fork-like sections 32, are provided on the lower member 16.

A further difference is that the centering-type engagement mechanism comprising the nose 17 and the recess 26 is configured such that the contact surfaces 35 are formed in each case by the interaction of the frontal surface 36 of the nose 17 and the matching surface of the recess 26. These contact surfaces, too, are engineered obliquely to match the tapering configuration of the frontal surface of the nose 17. Of course, as an alternative to this configuration, it would also be possible to provide the contact surfaces on either side of the nose 17, as in the embodiment according to FIGS. 1 and 2. The shoulder 34 is formed here in the vicinity of the fork-like sections 32. This arrangement again produces the space 33 described in connection with the embodiment according to FIGS. 1 and 2.

Figure 2:
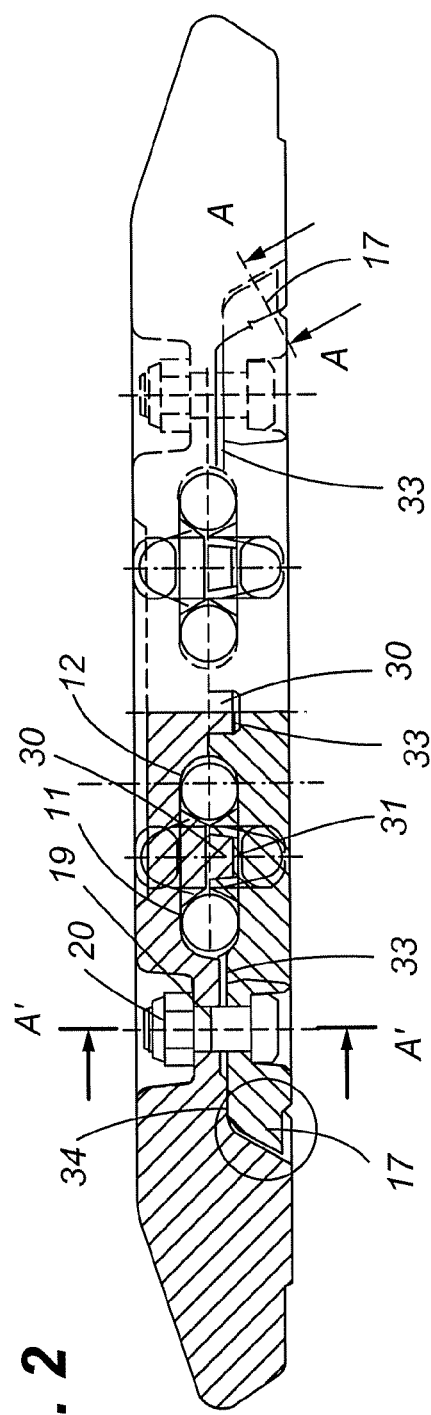
FIG. 2 shows a partly sectional view of the pusher of FIG. 1.

The embodiment according to FIGS. 8 and 9 corresponds largely with the embodiment according to FIGS. 1 and 2, but with the difference that a further bolted connection 19, 20 is provided that is located centrally between the chain beds 11 and 12, i.e. in the center between the two chain strands; there is accordingly a third bolted connection in addition to the two bolted connections located to the outside of the chain beds.

Figure 11:
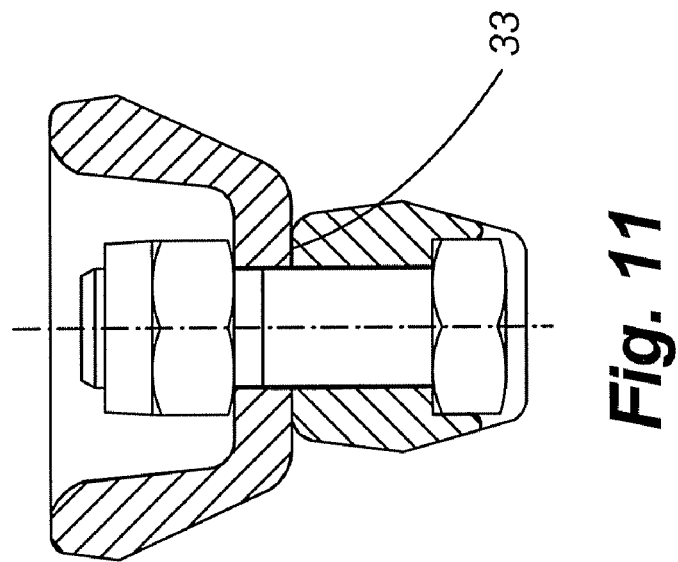
FIG. 11 shows a sectional view along the line B—B of FIG. 9.
Figure 10:
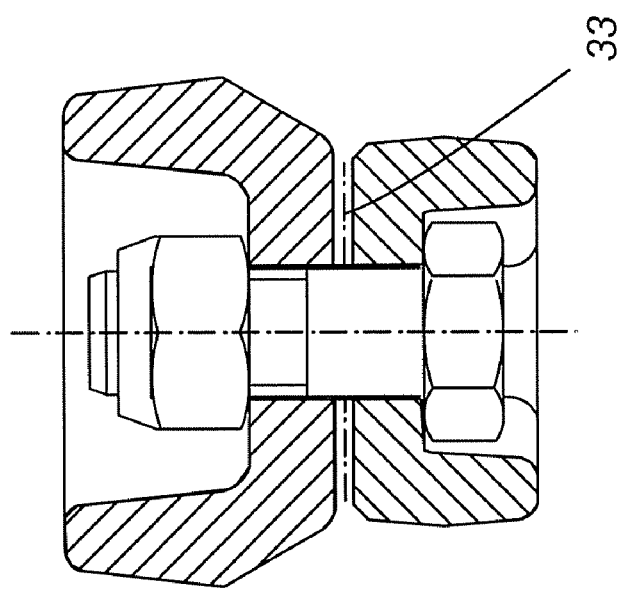
FIG. 10 shows a sectional view along the line A—A of FIG. 9.

As is evident from FIGS. 10 and 11, the centrally located bolted connection 19, 20 may be tightened here to such an extent as to close the clamping gap, so that the two inside, horizontal legs 38 and 39 of the two chains come into contact with the two inside chain beds 12. As a consequence, the horizontal chain leg is partially clamped between the upper member and the lower member of the pusher. Of course, the horizontal chain leg may be also be left unclamped by engineering the bolted connection 19, 20 such that on tightening it, the clamping gap is not bridged.

The embodiment according to FIGS. 12 and 13 largely resembles the embodiment according to FIGS. 1 and 2. However, as shown in FIGS. 14 and 15, the centering knuckles 30 and the centering recesses 31 are configured such as to form lateral contact surfaces. These contact surfaces are denoted by the reference numeral 40.

According to FIG. 16, the lateral surfaces—here denoted as the surfaces 41—of the centering nose 17 are configured in the area of the nose-like centering engagement mechanism as the contact surfaces of the tongue-and-groove joint.

Figure 17:
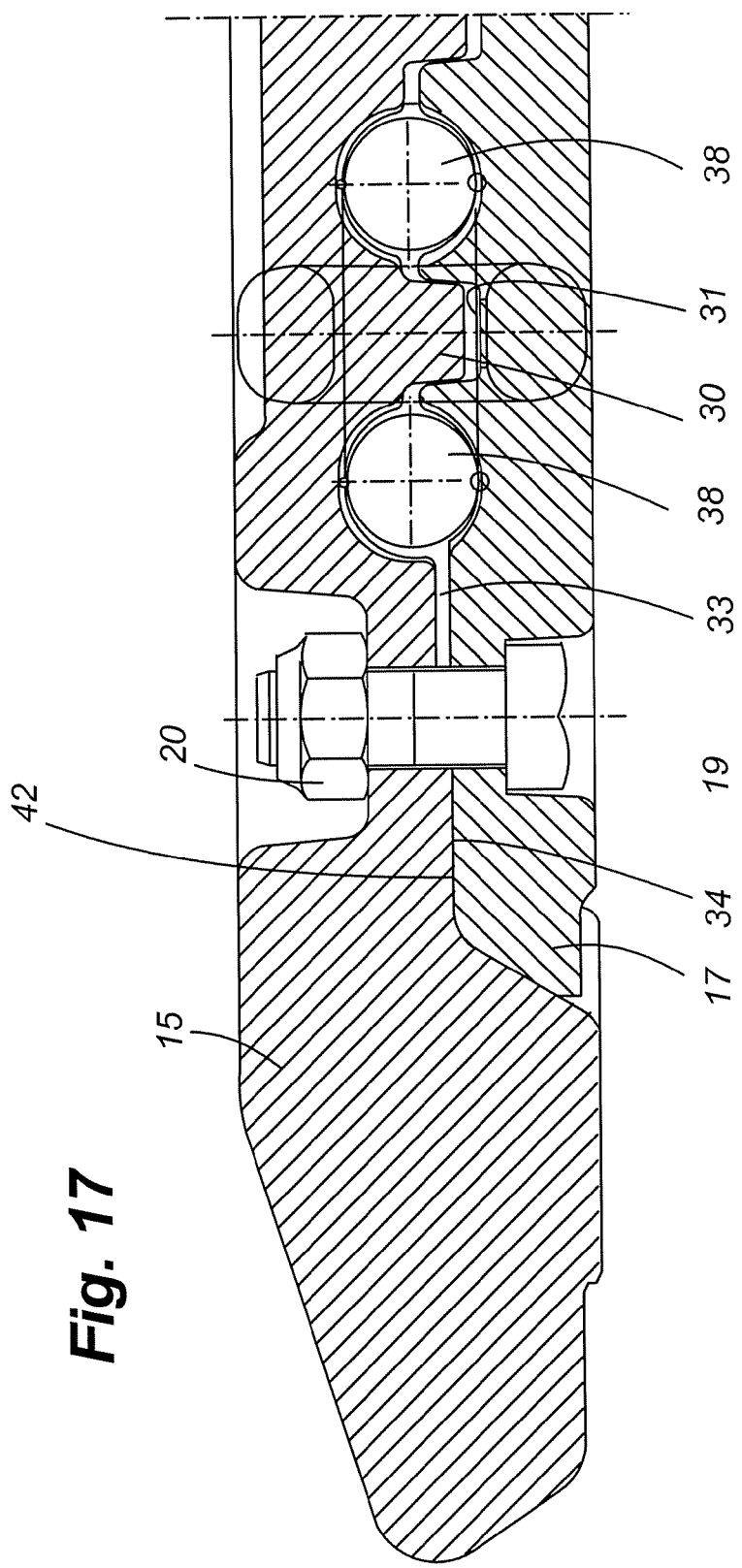
FIG. 17 shows a partial sectional view of a further embodiment of a pusher.

FIG. 17 shows another embodiment, in which the supporting surface 42 formed by the shoulder-like protuberance 34 on the upper member 15 extends almost to the vicinity of the bolted connection 19, 20, so that to the inside thereof, the space denoted by 33 is formed as usable clamping gap. The centering knuckle 30, too, dips into the recess 31 such that a gap, or space, remains. It is thus possible, depending on the degree to which the bolted connections 19, 20 are tightened, to clamp the two horizontal chain legs 38.

Figure 18:
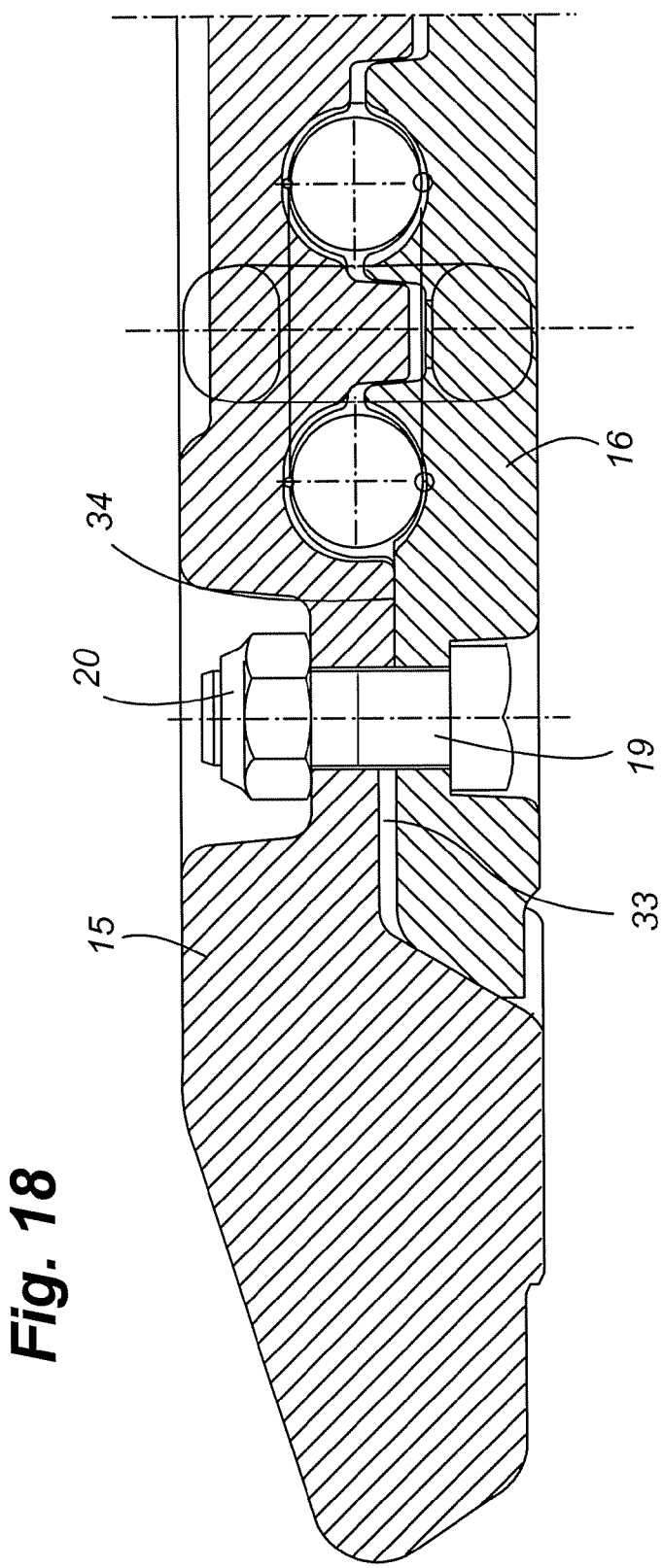
FIG. 18 shows a partial sectional view of a further embodiment of a pusher.

In the embodiment according to FIG. 18, the shoulder-like protuberance 34 is located within the area bounded by the bolted connections 19, 20 provided at each end, and extends, in this case too, almost to the vicinity of the bolts 19. The slit-like space located in the area to the outside of the two bolts 19 is denoted by 33. Otherwise, this embodiment resembles the embodiment according to FIG. 17.

Figure 19:
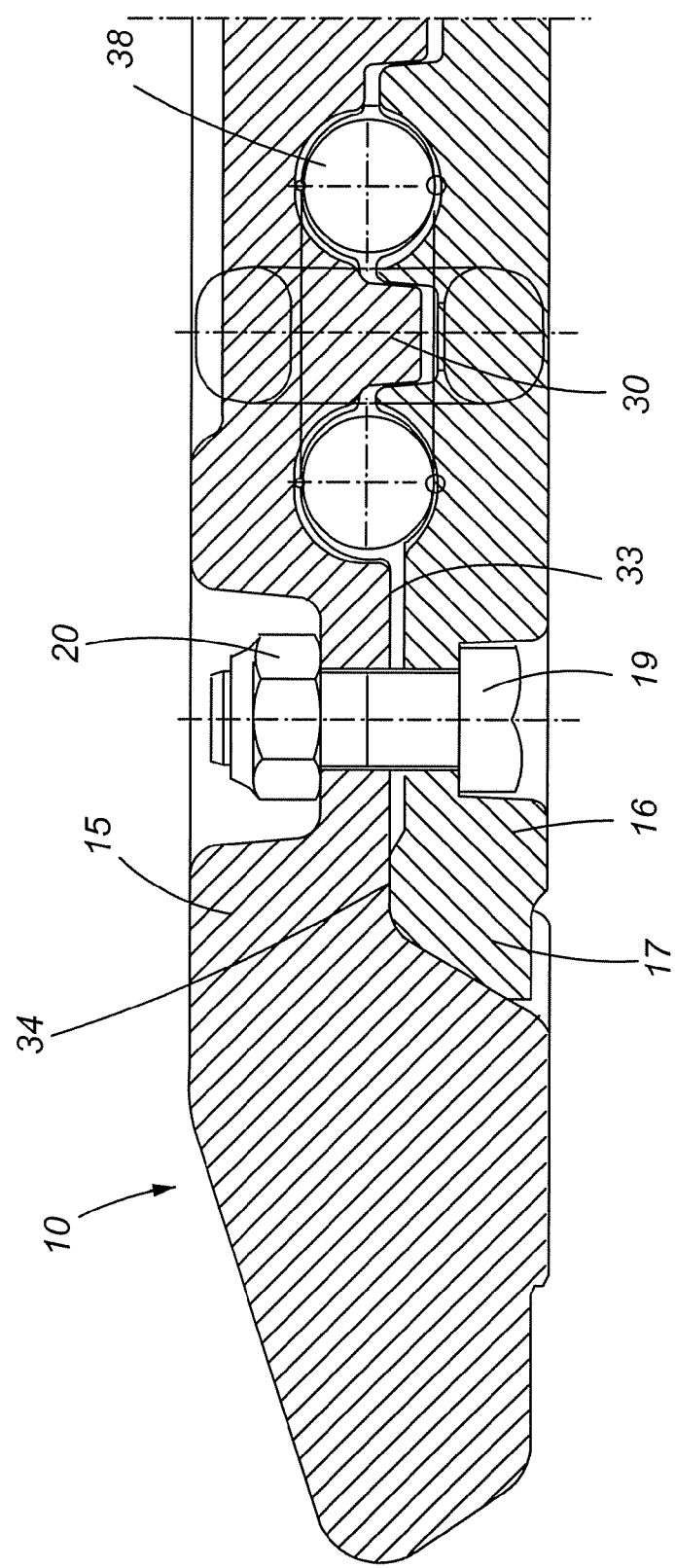
FIG. 19 shows a partial sectional view of a further embodiment of a pusher.

In the embodiment according to FIG. 19, the protuberances 34 provided at each end, of which, because only half of the pusher 10 is illustrated, only the left protuberance 34 is visible, are engineered on the lower member 16, in the vicinity of the centering noses 17. This arrangement again results in a slit-like space 33, particularly in the vicinity of the bolted connections 19, 20.

Figure 20:
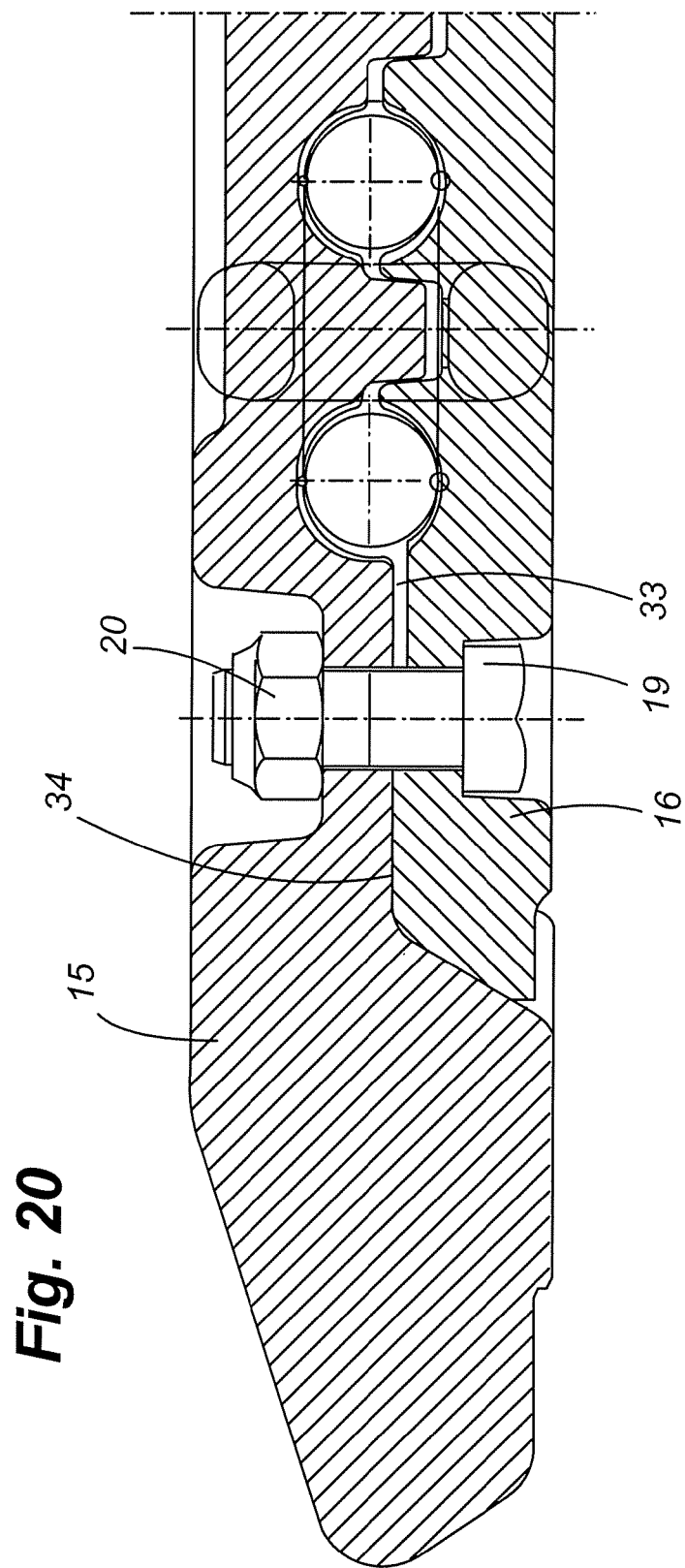
FIG. 20 shows a partial sectional view of a further embodiment of a pusher.

In the embodiment according to FIG. 20, the protuberance 34 extends almost to the bolt 19, which means that this embodiment essentially resembles the embodiment according to FIG. 17; however, the shoulder-like protuberance 34 is engineered on the lower member 16. The space 33 is located in the area bounded by the two bolted connections 19, 20.

Figure 21:
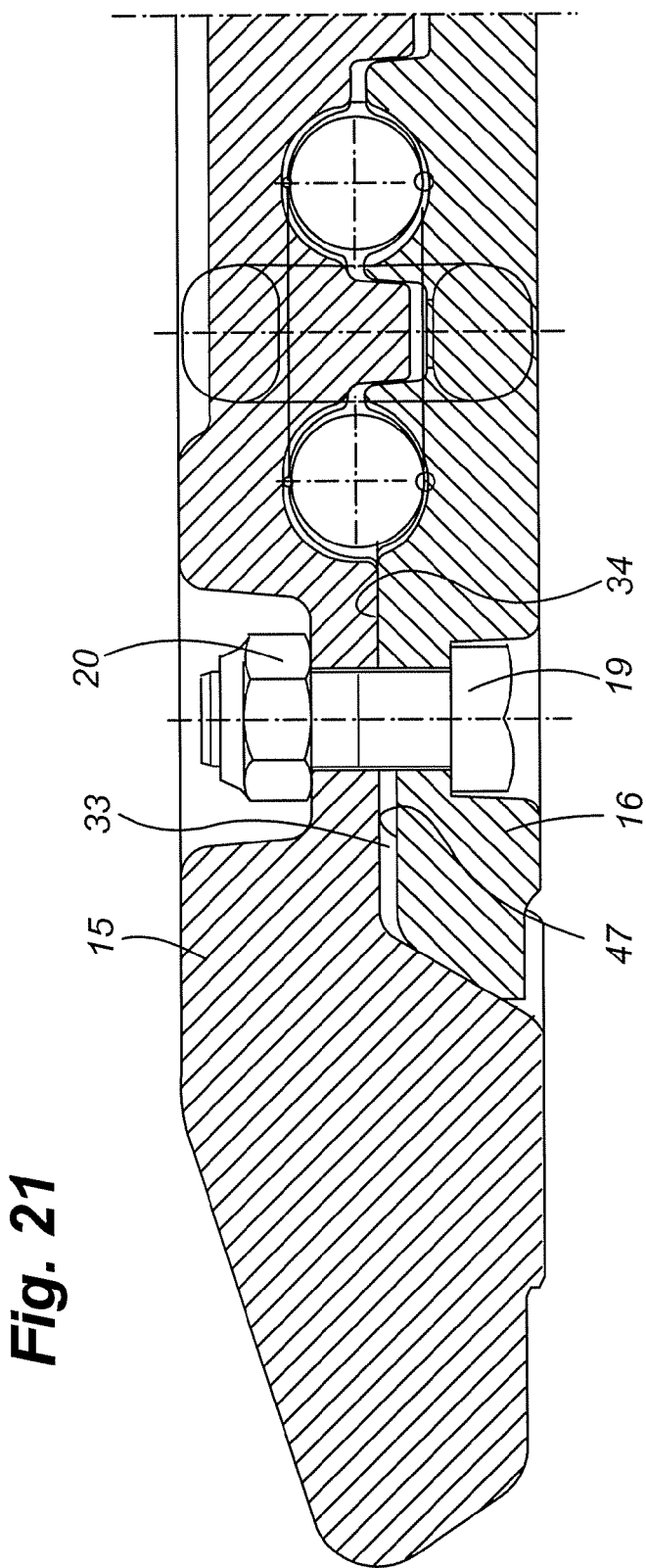
FIG. 21 shows a partial sectional view of a further embodiment of a pusher.

In the embodiment according to FIG. 21, the shoulder-like protuberance 34 is again located within the area bounded by the two bolted connections 19, 20, and extends almost to the bolt 19.

Figure 22:
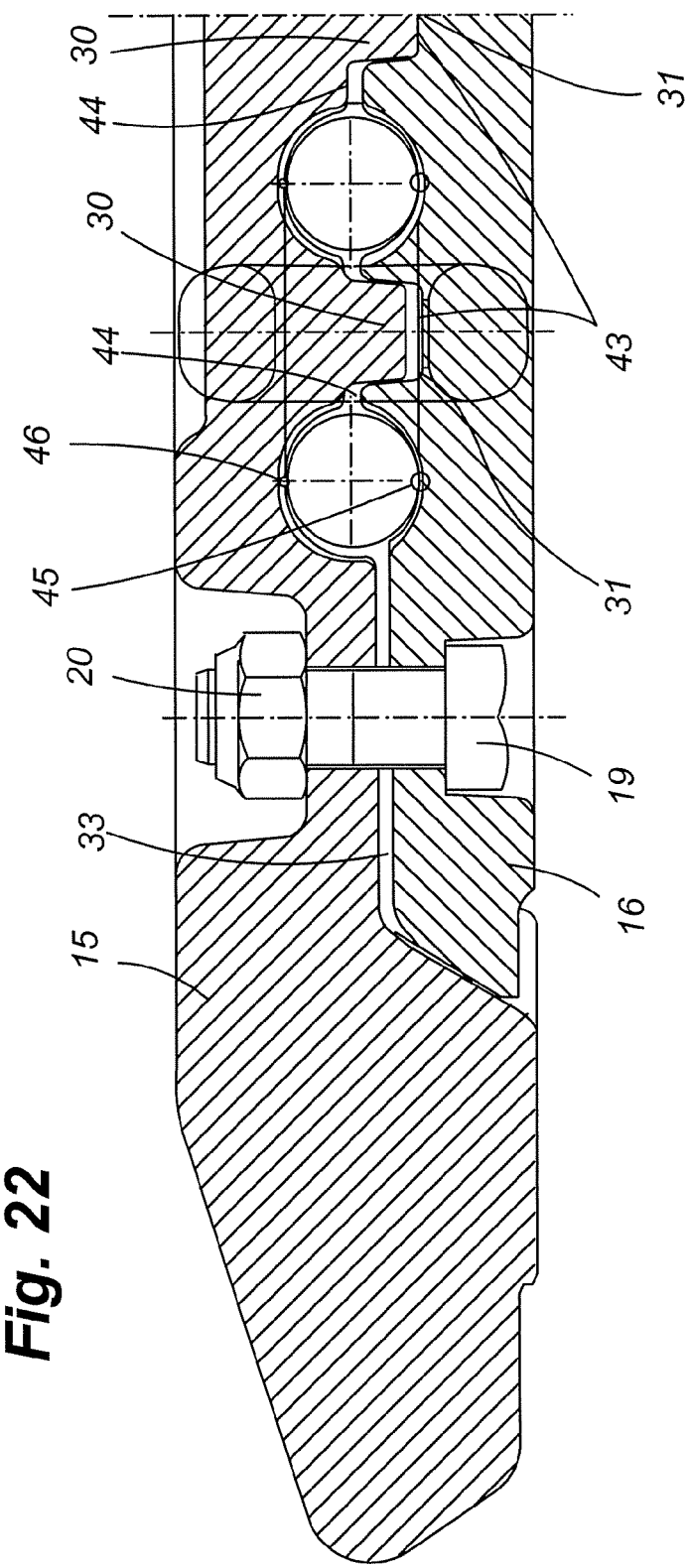
FIG. 22 shows a partial sectional view of a further embodiment of a pusher.

In the embodiment according to FIG. 22, the space 33 is formed in the vicinity of the bolted connections 19, 20—once again, only the left bolted connection is visible because only half the pusher is shown—by increasing the depth of the centering knuckle 30, which forms a contact surface denoted by 43 with the recess 31. The additional, centrally located knuckle 30 dips down to the same depth and forms a supporting surface with the bottom of the recess 31. Only half of the centrally located centering knuckle 30 and of the recess 31 is shown. A corresponding space, denoted here by 44, is formed also in the area of the chain bed. With this configuration, desired and selective clamping of the chain legs is possible by varying the degree to which the bolted connections 19, 20) are tightened; the contact surfaces are denoted by 45 and 46.

The invention claimed is:

1. A pusher for scraper chain conveyors of the kind used in underground mining, comprising an upper member and a connectable lower member, said two members being connectable by means of a bolted connection, each member of said pusher featuring one part of one or more chain beds through which a flat jointing plane runs, as well as one part of the recesses provided for the bolts of the bolted connection and located to the outside of the chain bed, the upper member and the lower member embracing each other at least partially, and the upper member being configured as a bow-like bridge element with a bar-like central part and with downwardly projecting cuneiform ends that wrap over both ends of the bar-like lower member by the cuneiform ends from above, the two cuneiform ends of the bridge-like upper member having upper and lower guide surfaces sloping towards each other in V-formation, and the upper member and the lower member engaging each other at each end by means of nose-like centering projections on the upper member or the lower member, said projections engaging complementary recesses in contact surfaces of the lower member or the upper member, wherein supporting surfaces are provided between the upper member and the lower member in the area between the cuneiform ends at at least one of the bar-like central part of the upper member and the bar-like lower member, said supporting surfaces effecting a gap between the upper member and the lower member, at least in a vicinity of the bolted connections.

2. The pusher according to claim 1, wherein the supporting surfaces are formed by shoulders on at least one of the upper member and the lower member, which shoulders, at least in the vicinity of the bolted connections, form a preferably slit-like space between the upper member and the lower member.

3. The pusher according to claim 2, wherein the shoulders are provided in the two lateral end portions of the upper member and the lower member.

4. The pusher according to claim 2, wherein the preferably slit like space extends over a substantial area between the upper member and the lower member, preferably extending essentially over the entire length of the pusher's jointing plane.

5. The pusher according to claim 2, wherein the shoulders are engineered within the area between the bolted connections provided in both lateral end portions.

6. The pusher according to claim 2, wherein the shoulders are provided in a vicinity of the nose-like centering projections.

7. The pusher according to claim 2, wherein the shoulders are formed by knuckle-like centering protuberances which are raised in such manner that on tightening of the bolted connections, the knuckle-like centering protuberances abut on a bottom of the complementary recess in a counterpart and the two chain legs are not clamped.

8. The pusher according to claim 1, wherein an additional centering knuckle that interacts with a complementary recess is provided at a center of the pusher.

9. The pusher according to claim 1, wherein the engaging surfaces, or contact surfaces, between the nose-like centering projection and the centering recess are formed by a frontal nose surface, two lateral nose surfaces or surfaces on either side of and bordering on the recess.

10. The pusher according to claim 1, wherein the supporting surfaces forming the space are formed by a depression on a bottom of the upper member and/or of the lower member.

11. The pusher according to claim 1, wherein the chain link is held by friction and positively within the chain bed, there being in the jointing plane a small space between the upper and lower members which permits pretensioning of the two members.

12. The pusher according to claim 1, wherein an underside of the lower member is provided in a vicinity of its ends with recesses that create a space between each end of the lower member and a base plate of the conveyor.

13. The pusher of claim 12, wherein the recessed surface of the lower member is flush with a lower surface of the wrap-over ends of the upper member.

* * * * *